United States Patent [19]

Lewis

[11] 4,072,280
[45] Feb. 7, 1978

[54] TAPE AND/OR FILM HANDLING MECHANISM

[75] Inventor: Richard A. Lewis, Sherman Oaks, Calif.

[73] Assignee: Interdyne Company, Van Nuys, Calif.

[21] Appl. No.: 681,467

[22] Filed: Apr. 29, 1976

Related U.S. Application Data

[63] Continuation of Ser. No. 563,292, March 31, 1975, abandoned.

[51] Int. Cl.² .................. G03B 1/04; G11B 15/32
[52] U.S. Cl. ............................ 242/195; 226/91; 352/235
[58] Field of Search ............ 242/192, 195, 201–210; 226/91, 184, 192; 352/72–78, 125, 235; 206/387, 398, 400; 74/224–226; 15/210

[56] References Cited

U.S. PATENT DOCUMENTS

| 2,091,525 | 8/1937 | Runge | 242/193 |
| 2,979,277 | 4/1961 | Page et al. | 242/201 |
| 3,006,650 | 10/1961 | Ellmore | 226/91 |
| 3,109,218 | 11/1963 | Morgan | 226/192 |
| 3,293,682 | 12/1966 | Giles | 15/210 |
| 3,536,276 | 10/1970 | Bundschuh et al. | 242/192 |
| 3,627,229 | 12/1971 | Wangerin | 242/210 |
| 3,797,777 | 3/1974 | Hosono et al. | 242/197 |
| 3,809,218 | 5/1974 | Furst | 206/400 |

Primary Examiner—Leonard D. Christian
Attorney, Agent, or Firm—William W. Haefliger

[57] ABSTRACT

A tape storage unit comprises a single reel having flanges between which tape is stored and protected by a strippable leader strip wound about the tape and snapped into grooves in the flanges. A tape transport compatible with the reel includes a second reel with leader receiving grooves formed in its flanges, there being structure to guide and urge the leader toward the grooves in the reels in either direction of tape travel; also, novel drive systems for the reels are provided.

32 Claims, 18 Drawing Figures

FIG. 2.

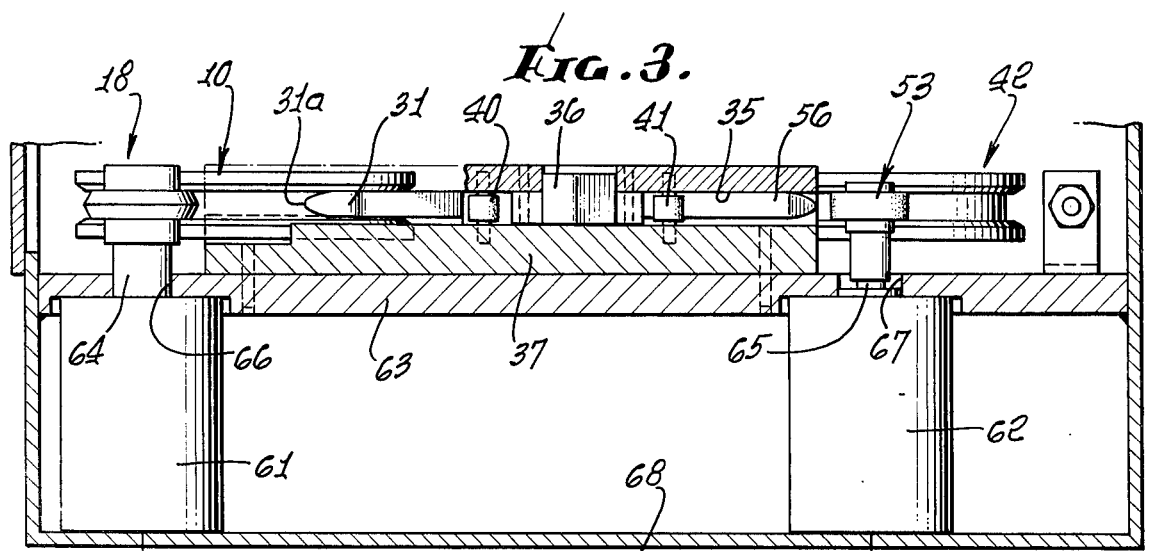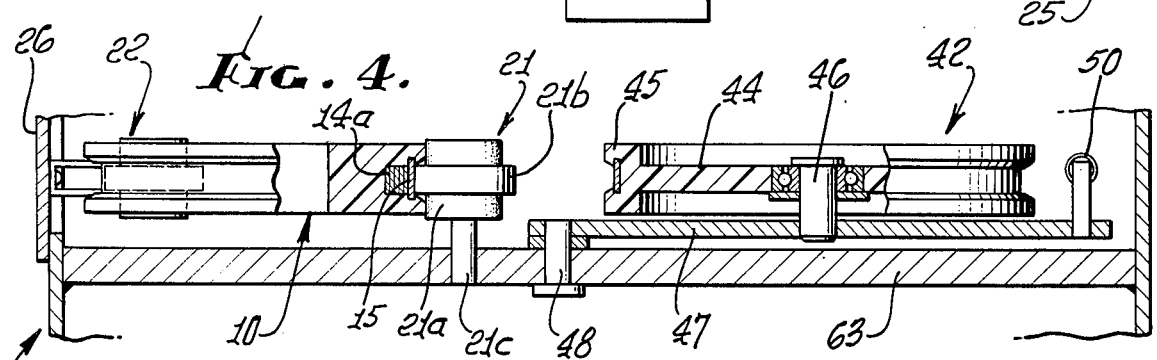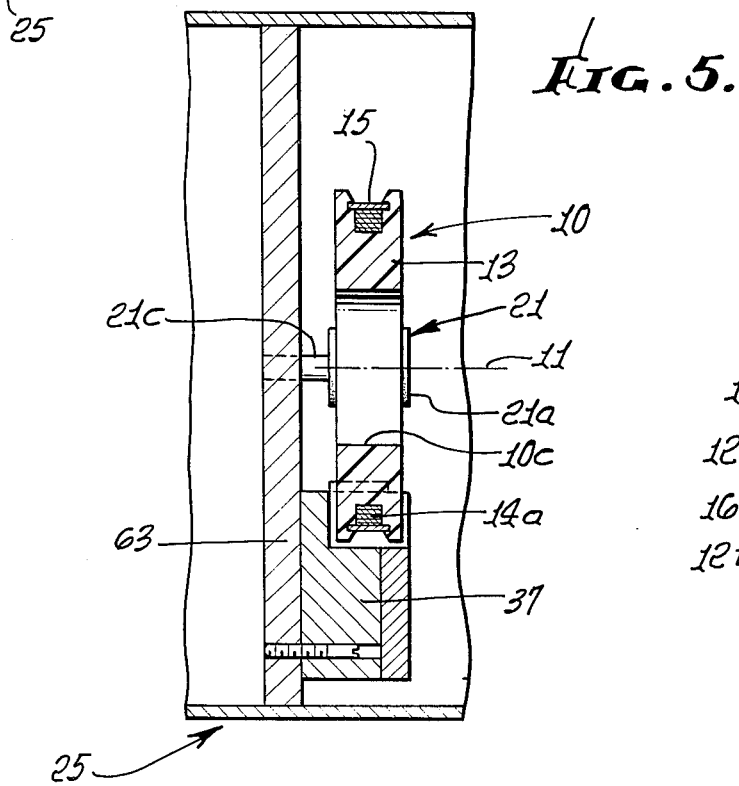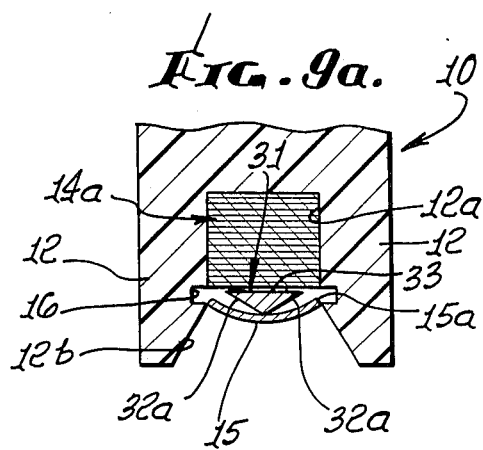

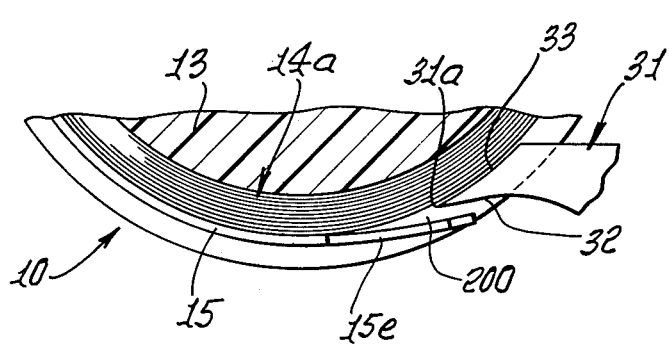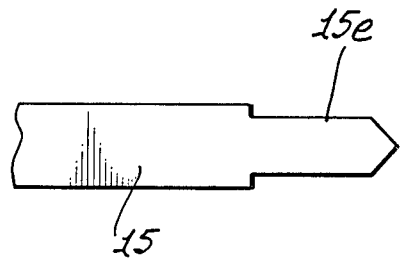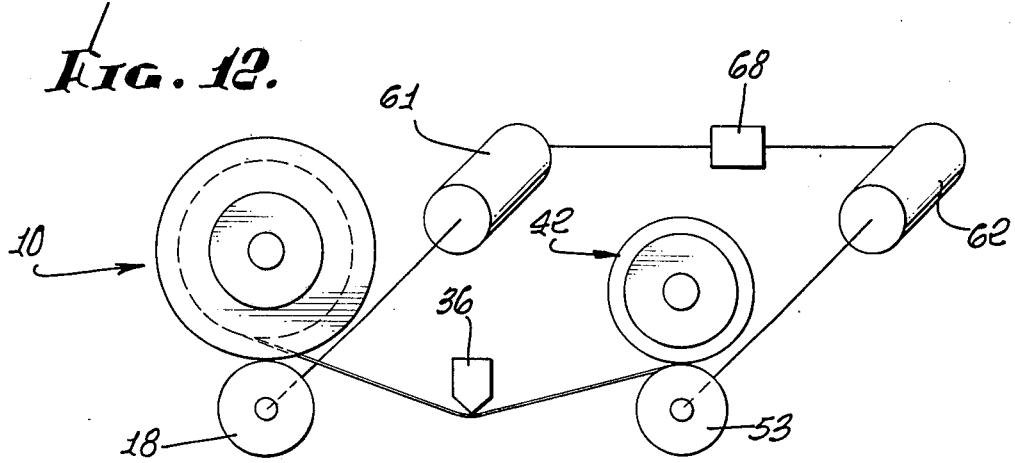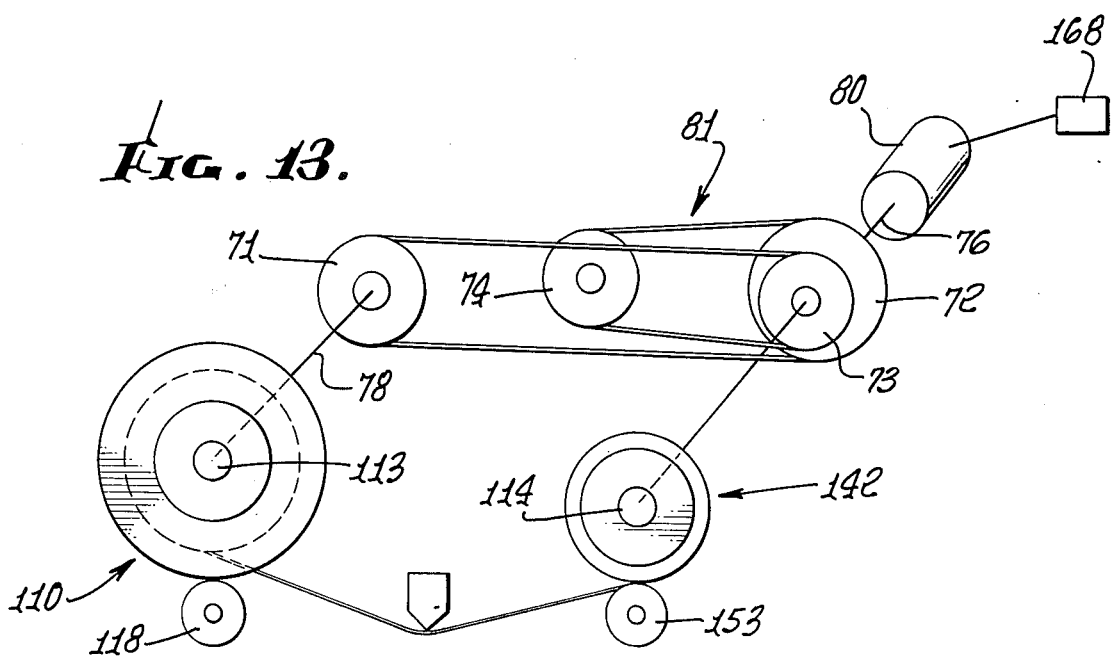

TAPE AND/OR FILM HANDLING MECHANISM

This is a continuation, of application Ser. No. 563,292, filed Mar. 31, 1975, and now abandoned.

BACKGROUND OF THE INVENTION

This invention relates generally to tape and/or film handling mechanisms, and more particularly concerns elimination of many problems encountered in reel-to-reel, cassette and cartridge tape transports.

There is a need in the above fields for a simple, low-cost, self-sealing magnetic tape or film reel which can be easily inserted onto and removed from transport equipment, thereby providing a convenient and safe container during transportation and/or storage of the tape or film as well as the information contained on it. In this regard, prior reels having flexible, radially slotted, or corrugated flanges did not cooperate with leaders to protect tape environmentally, and were not also suitable to be driven peripherally. In addition, there is need for simple, low-cost tape deck or transport apparatus as well as a drive system compatible with such a self-sealing reel. To my knowledge, no prior equipment meets these needs in the unusually advantageous manner as is now afforded by the present invention.

SUMMARY OF THE INVENTION

It is one major object of the invention to provide a low-cost, simple, self-sealing tape or film storage unit which meets the above needs. Basically, the unit comprises:

a. a reel having an axis, spaced substantially rigid flanges extending normal to said axis, and a hub about which tape is wound for storage between the flanges, b. a leader strip connected with the tape, the width of the leader strip being greater than the tape width, and c. there being grooves sunk in the inner walls of the flanges and extending about said axis outwardly of the hub to receive the opposite edges of the leader strip so that the tape becomes protectively confined by the flanges and leader strip.

As will be seen, when removed from transport mechanism, the self-sealing reel including the leader completely encloses the tape, which is then protected from the environment. Compared to existing cartridges or cassettes, this self-sealing supply reel achieves the maximum in reliability and the minimum in cost, since it has no mechanism and, therefore, no precision or non-precision moving parts. It is a simple container, easily molded or fabricated, to house and protect the film and provide a spooling hub when inserted into the transport mechanism.

It is another major object of the invention to provide low-cost, simple and effective transport apparatus compatible with the self-sealing reel. Basically, the apparatus comprises:

a. first and second tape reels, each having an axis, a hub and spaced flanges projecting normal to said axis and radially outwardly of the hub, b. tape wound about one of the hubs and a leader strip connected with the tape, the width of the leader strip being greater than the tape width, c. there being grooves sunk in the inner walls of the flanges of each reel and extending about the reel axis outwardly of the hub to receive the opposite edges of the leader strip, d. means mounting the reels for rotation in spaced apart relation, e. guide means for guiding leader strip and tape travel between the reels, and f. rotors located adjacent the reel peripheries to urge the leader toward said grooves in either direction of tape travel between the reels.

As will be seen, the transport rotors may drive each reel by direct contact with the periphery of either the tape pack or the reel flanges; further, the transport employs structure enabling self-threading and unthreading, using relatively stiff leader material which is also used to seal-in the tape or film on the supply reel, as described. In addition, the transport provides means to easily disengage to strip the protective leader from the supply reel, automatically thread it through the transport mechanism across the magnetic head, and automatically attach it to the take-up reel.

It is a further object of the invention to provide drive means of unusual advantage for driving the rotors or reels, as described, one such means employing a single motor, reversible, differential drive employing an elastic belt, as will be seen.

These and other objects and advantages of the invention, as well as the details of illustrative embodiments, will be more fully understood from the following description and drawings, in which:

DRAWING DESCRIPTION

FIG. 2 is a side elevation taken in section through the FIG. 1 apparatus;

FIG. 3 is a bottom plan view taken in section on lines 3—3 of FIG. 2;

FIG. 4 is a plan view taken in section on lines 4—4 of FIG. 2;

FIG. 5 is an elevation taken in section on lines 5—5 of FIG. 2;

FIG. 9a is an enlarged fragmentary section showing the action of a stripper finger to bow the leader during stripping;

FIG. 9b is an enlarged side elevation showing a tail on the stored leader; and FIG. 9c is a plan view showing that tail;

FIG. 12 is a schematic showing of an alternate drive system using two motors, for driving the rotors seen in FIG. 2;

FIG. 13 is a schematic showing of an alternate single motor, differential belt drive system for driving the hubs of reels of the type seen in FIG. 2;

DETAILED DESCRIPTION

Figure 1:
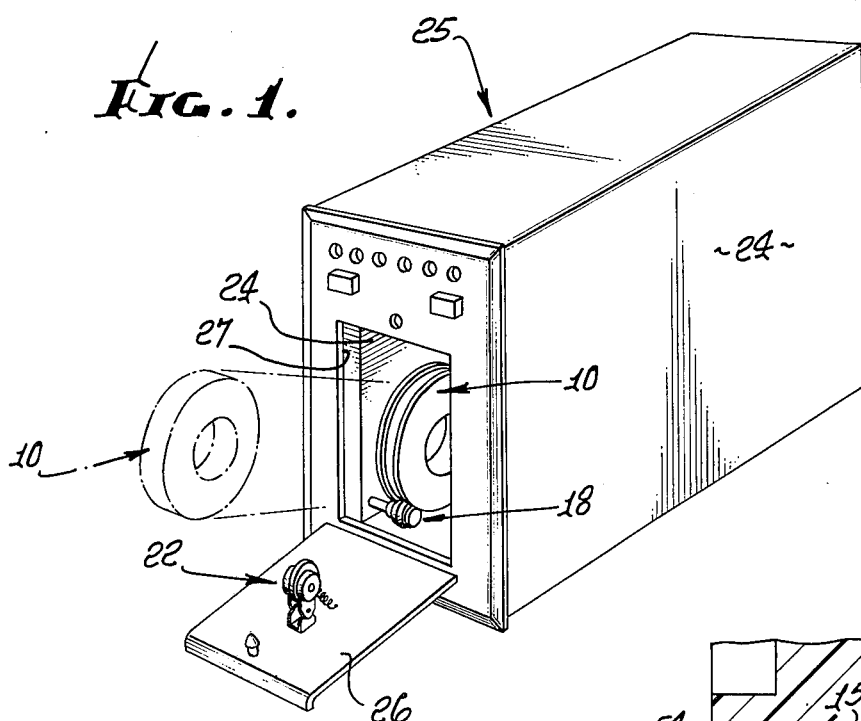
FIG. 1 is a perspective view of apparatus employing the invention.

Referring to FIGS. 1, 2, 5, 6 and 9, the tape storage or supply unit comprises a self-sealing supply reel 10 having an axis 11, spaced flanges 12 extending in planes normal to the axis, and a hub 13, about which stored magnetic tape 14 is wound in a spiral pack 14a between the flanges. Note that the tape width is substantially the same as the width of the space between the flange inner walls 12a, there being slight clearance therebetween.

The numeral 15 indicates a thin leader strip connected with the end of the tape, the strip for example consisting of plastic such as MYLAR. While being lengthwise flexible, the leader is resiliently flexible widthwise so as to tend toward a flat planar configuration as indicated in solid lines in FIG. 6. Further, the width of the leader is typically greater than the tape width, as well as the width of the gap between flange inner faces 12a. In stored condition, the opposite edges 15a of the leader are received in grooves 16 sunk in the inner walls of the flanges and extending annularly about the hub in radially outwardly spaced relation thereto; accordingly, when the length of the stored leader is at least about equal to the circular dimensions of the grooves 16, the tape 14 is protectively confined inwardly of the leader and between the flanges. The leader normally extends laterally to the bottoms of the grooves.

Figure 6:
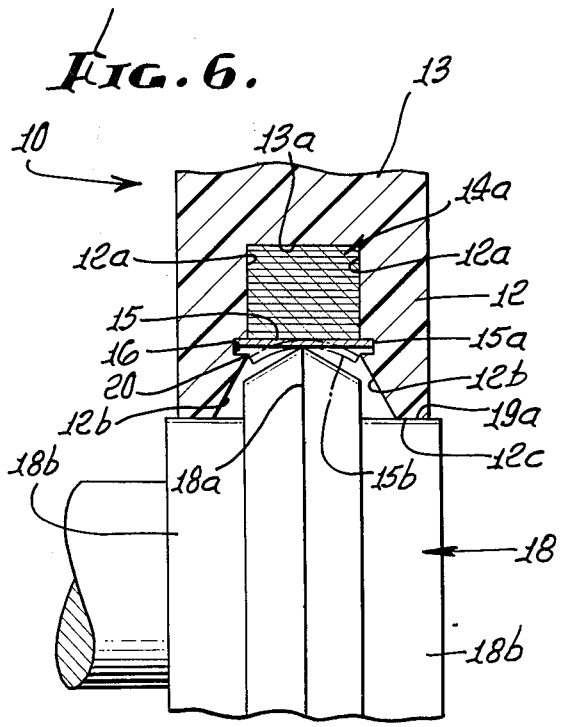
FIG. 6 is an enlarged fragmentary section taken on lines 6—6 of FIG. 2.

FIG. 6 illustrates the manner in which the leader strip may be forcibly displaced into stored position in the grooves 16. For this purpose, the flanges 12 may have annularly opposite faces 12b which taper radially inwardly toward the grooves 16, to guide the leader opposite edges toward the grooves. In addition, a leader engaging rotor 18 has a crowned or radially outwardly tapering periphery, the apex portion 18a of which projects between the flanges and typically between the grooves 16 so as to be in local contact with the leader to bow it widthwise and toward the reel axis for forcibly urging or "snapping" the leader opposite edges 15a into the opposite grooves 16. FIG. 6 shows this temporary resiliently bowed or locally flexed condition of the leader at broken lines 15b.

FIG. 6 also illustrates the engagement of the annular peripheries 19a of rotors flanges 18b with the peripheries 12c of the reel flanges 12. Such interengagement locates the apex 18a generally between the grooves 16 so as to forcibly bow the leader between those grooves as shown, enabling camming of the leader opposite edges 15a over the edge interconnections of the grooves with faces 12b, at locations 20.

Figure 2:
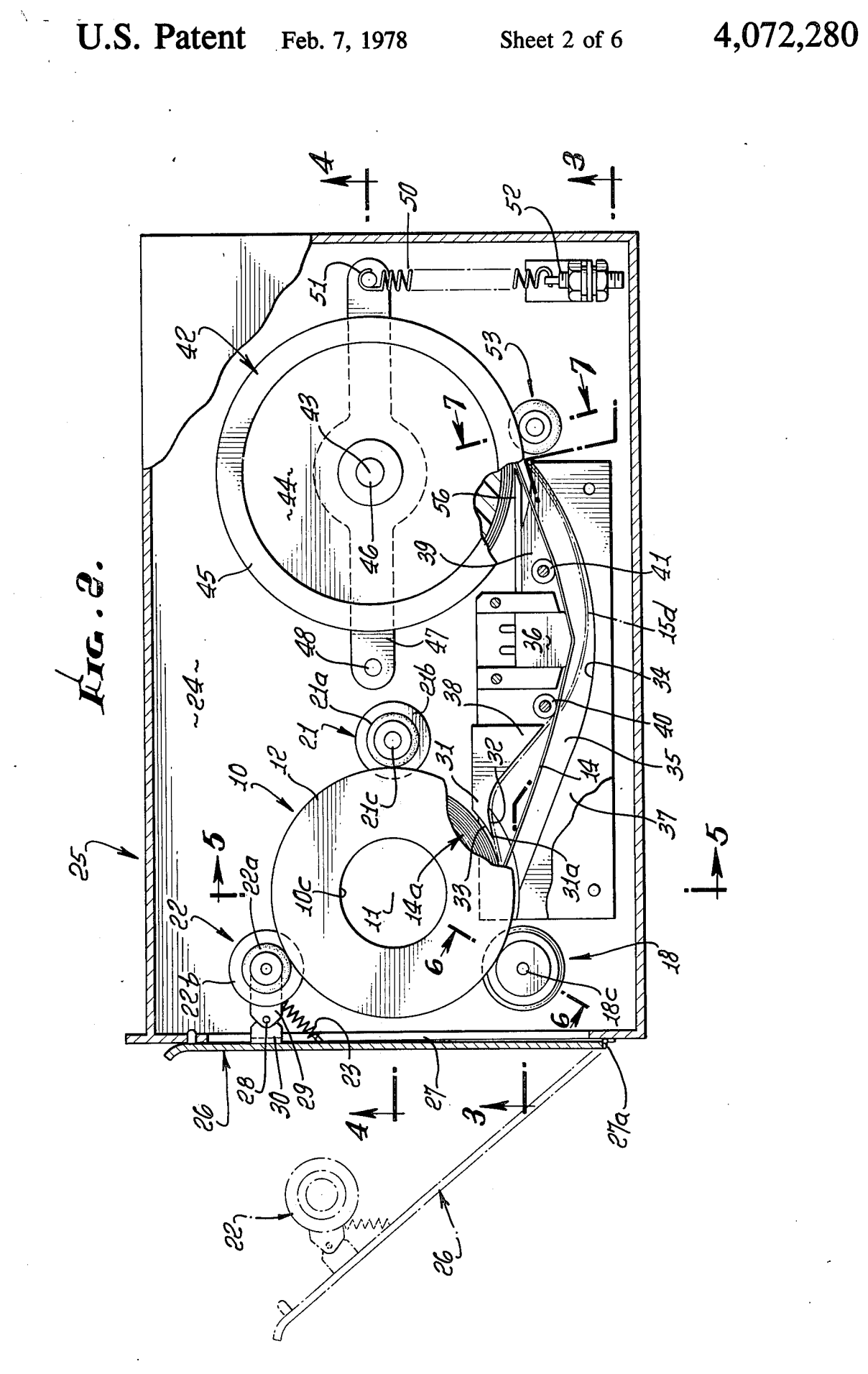

Referring to FIG. 2, the supply reel 10 is shown positioned by three rotors designated at 18, 21 and 22. The latter two rotors 21 and 22 may have configurations similar to that of rotor 18 described above, so that they hold the reel in the same plane and may also tend to urge the leader into the grooves 16 as the reel rotates. For example, rotor 21 has flanges 21a in engagement with the reel flange peripheries and an apex portion 21b projecting between those flanges 12, rotor 22 has flanges 22a in engagement with the reel flange peripheries, and an apex portion 22b projecting between those flanges 12. The three rotors are shown located generally equi-angularly about the reel axis (for example at about 120° separations), rotors 18 and 21 being fixed relative to a housing 25, and rotor 22 being movable relative to the housing. The construction is such that reel 10 is removable from its illustrated position when rotor 22 is displaced sufficiently relatively away from the reel. Accordingly, it is clear that different reels 10 may easily and rapidly be brought into the position of reel 10 in FIG. 2 as by locating the reel flanges in the position shown with respect to rotors 18 and 21; thereafter, rotor 22 may be moved into the position as shown, and yieldably urged toward the reel, as by a spring 23, to maintain all the rotor flanges 18a, 21a and 22a in forcible engagement with the reel flange peripheries.

In the example, rotors 18 and 21 have respective axles 18c and 21c carried by the walls 24 (or other structure integral with) container or housing 25, whereas movable rotor 22 is carried by a housing end closure 26. The latter is outwardly movable, as enabled by pivot connection 27a to the housing, to displace the rotor 22 for example to the position seen in FIG. 1. At that time, the annular reel 10 is easily manually removed from the interior of the housing, as by grasping it manually and removing it off rotor 18 and 21 and outwardly through the end opening 27. Replacement of the reel 10 is likewise easily accomplished, and side guides may be provided to help direct the inserted reel onto the rotors 18 and 21; thereafter, the door 26 is closed to bring rotor 22 into engagement with the reel flange peripheries. The spring 23 serves to yieldably hold the rotor 22 against the reel flanges, as may be facilitated by pivoting at 28 of the rotor axle mount 29 to a post 30 on the closure.

Another advantage with the annular reel construction, as described, resides in its ready capability for direct employment on standard existing computer memory equipment, obviating need to transfer data on the tape to another reel compatible with computer memory equipment. For example, the central hole 10c in the reel can be made to fit existing reel drive hubs on computer equipment, as for example IBM type hubs on ½ inch tape drivers.

Figure 9:
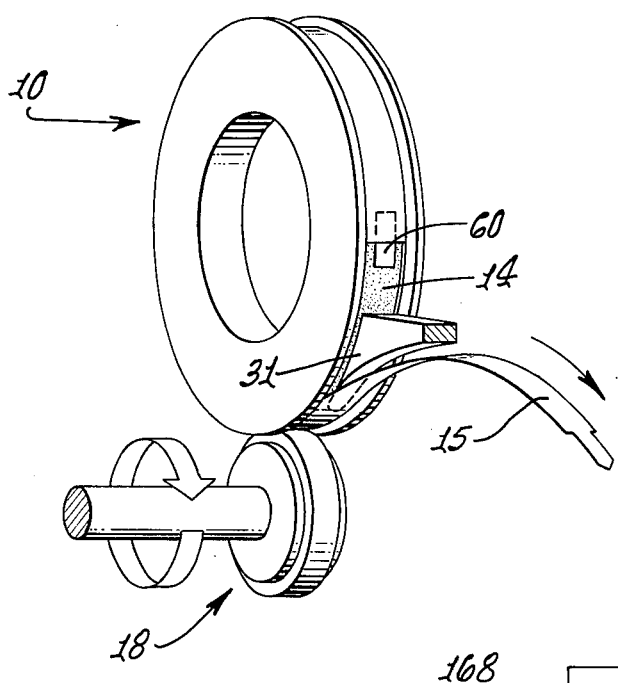
FIG. 9 is a perspective showing of the self-sealing supply reel seen in FIG. 2, the reel rotating in tape unwinding direction.

Referring now to FIGS. 2, 3, 9, 9a and 10, it will be noted that a stripper finger 31 projects between the leader 15 and the tape 14 in the pack in the reel, and between flanges 12, the finger serving to strip the leader free of the grooves 16 as the reel rotates in a tape supply direction (see FIGS. 9 and 9a). Finger 31 has opposite faces 32 and 33 tapering toward and apex at 31a, face 33 lying generally parallel to and adjacent the surface of the tape pack. Downwardly lengthwise concave face 32 of the finger deflects the stripped leader and tape toward and into wide guide slot 35 for receiving and guiding the unwinding leader and tape. FIG. 9a shows that the face 32 preferably has sections 32a which taper toward the underside of the leader to bow it outwardly during stripping. FIGS. 9b and 9c show a tab or tail 15e on the end of the leader and which diverges outwardly away and stored leader to provide a gap 200 into which the stripper finger is received to initiate stripping. Slot 35 extends as shown in FIG. 2 toward a read/write head 36, adjacent which the tape is passed.

Figure 10:
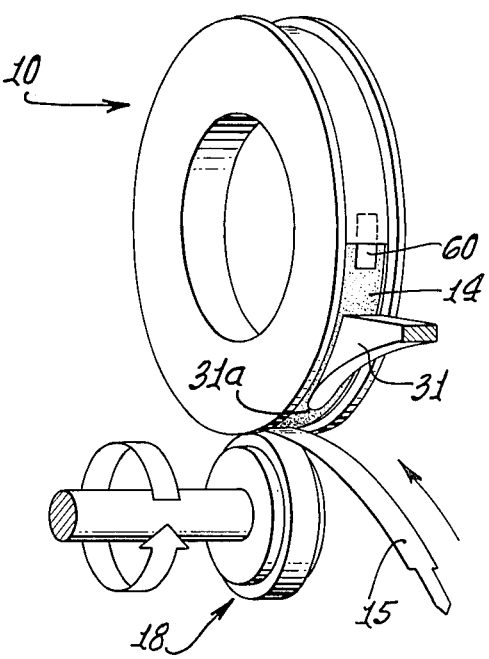
FIG. 10 is a view like FIG. 9, but showing the reel rotating the tape re-winding direction.

The tape guide means may also be considered to include structure 37 forming upwardly concave guide surface 34, and acting with structure 38 and 39 to form the wide slot 35 to guide the leader during threading. Broken line 15d indicates the leader path during initial threading. The guide means may also include tape guides such as idler rollers 40 and 41 the peripheries of which are generally tangent with the tensioned tape as it travels lengthwise in the slot 35. FIG. 10 shows the leader 15 being wound on reel 10 as the latter rotates in re-wind mode. Connection of the leader with the tape appears at 60. The length of the leader is typically sufficient to at least once overlap the connection 60, and the radial dimensions of grooves 16 are such as to accommodate two thicknesses of leader.

Figure 7:
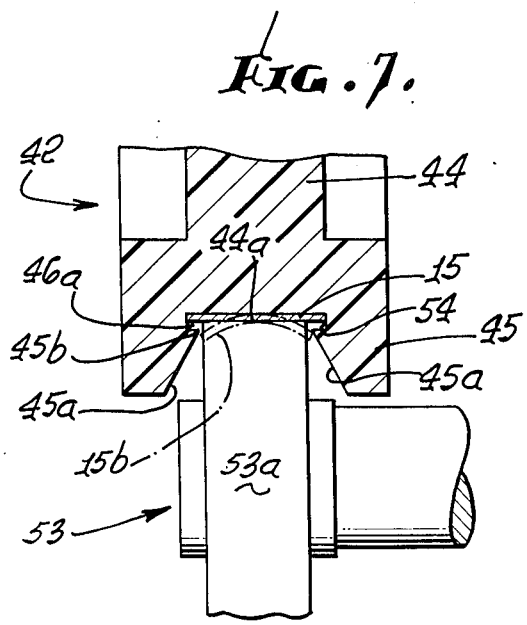
FIG. 7 is an enlarged fragmentary section taken on lines 7—7 of FIG. 2.

FIGS. 2 and 7 show the provision and construction of a second or take-up reel 42 having an axis 43, hub 44, and spaced flanges 45 projecting normal to axis 43 and radially outwardly of the hub. The reel 42 also may have a stub axle or axles 46 carried by a link 47 pivotally connected at 48 to the housing to swing in a plane normal to axis 43. In addition, a tension spring 50 may be connected between the link at 51, and the housing at 52 to yieldably urge the link and reel toward a rotor 53. The latter is located to receive the leader 15 delivered from slot 35 toward the periphery of the hub 44 adjacent the periphery of rotor 53.

Figure 8:
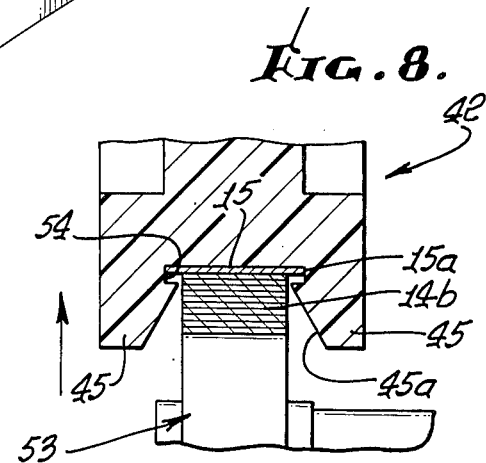
FIG. 8 is a view like FIG. 7 but showing tape build up.

As the reel 42 and rotor 53 rotate in take-up mode, the leader entering therebetween is bowed or flexed in a manner similar to that described in connection with FIG. 6, so that the leader edge portions 15a are forced into grooves 54 sunk in the inner faces of flanges 45 and the leader 15 and tape 14b compressively stored as seen in FIG. 8. Such faces taper at 45a toward the leader annular storage zone 46a between the grooves, and adjacent the outer surface 44a of the hub. The radii of the leader storage zone, and grooves 54, from the take-up reel axis 43 may be the same as the radius of the grooves 16 from the supply reel axis 11. Also, the radial thicknesses of the grooves 54 are wide enough to allow two thicknesses of the leader to "snap" in place. Formation and storage of the tape in a tight pack 14b outwardly of the leader in FIG. 8 is facilitated by the frictional capture of the leader in grooves 54, as described, and in this regard a partial second wrap of the leader over the first wrap, to wedge two wraps in grooves 54, may be employed to generate such frictional capture of the leader, without circular slippage relative to the hub. The rotor 53 may include a central portion having a flat periphery 53a the width of which is approximately the same as the gap width between the inner edges 45b of faces 45a. Note that a second guide and stripper finger 56 projects from structure 39 between the flanges 45 to guide the leader between the rotor 53 and the reel hub surface 44a.

In re-wind mode with the reels rotating clockwise in FIG. 2, the end of the tape feeds off the pack 14b adjacent the periphery 53a of rotor 53, then travels past finger 56 and lengthwise through slot 35; the tape end is then guided by finger surface 31a into adjacency to the hub surface 13a, of reel 10, and the tape wraps about the hub to form pack 14a seen in FIG. 6. Ultimately, the leader is stripped off reel 42 by finger 56, travels back through slot 35, and is stored in position about the tape pack 14a in the manner described above in connection with FIG. 6.

Accordingly, the rotors 18 and 53 serve as a means to urge the leader into the respective sets of grooves 16 and 54. Fingers 31 and 56 may also serve this function as well as serving to strip the leader out of the grooves. In addition, in the embodiment seen in FIGS. 2-5, the rotor 18 serves as a drive capstan for reel 10, and rotor 53 serves as a drive capstan for reel 42 peripherally driving the tape pack 146.

Also provided is what may in general be referred to as drive means to rotate the reels 10 and 42 both in one rotary direction and also both in the opposite rotary direction. In FIGS. 2-5, the drive means is connected with the two rotors 18 and 53 as described above, and FIGS. 4 and 12 show the employment of two motors 61 and 62 respectively connected with the rotors. Such may be located within the housing 25, or external thereto, there being a mounting plate 63 extending between the motors and rotors, with rotor shafts 64 and 65 projecting through openings 66 and 67 in that plate. Control means 68 is shown as connected with the motors, and may include amplifiers, switches, and associated circuitry including encoding means. The drive in each case is sue that the tape extent being transported between the two reels is maintained in tension.

Figure 11:
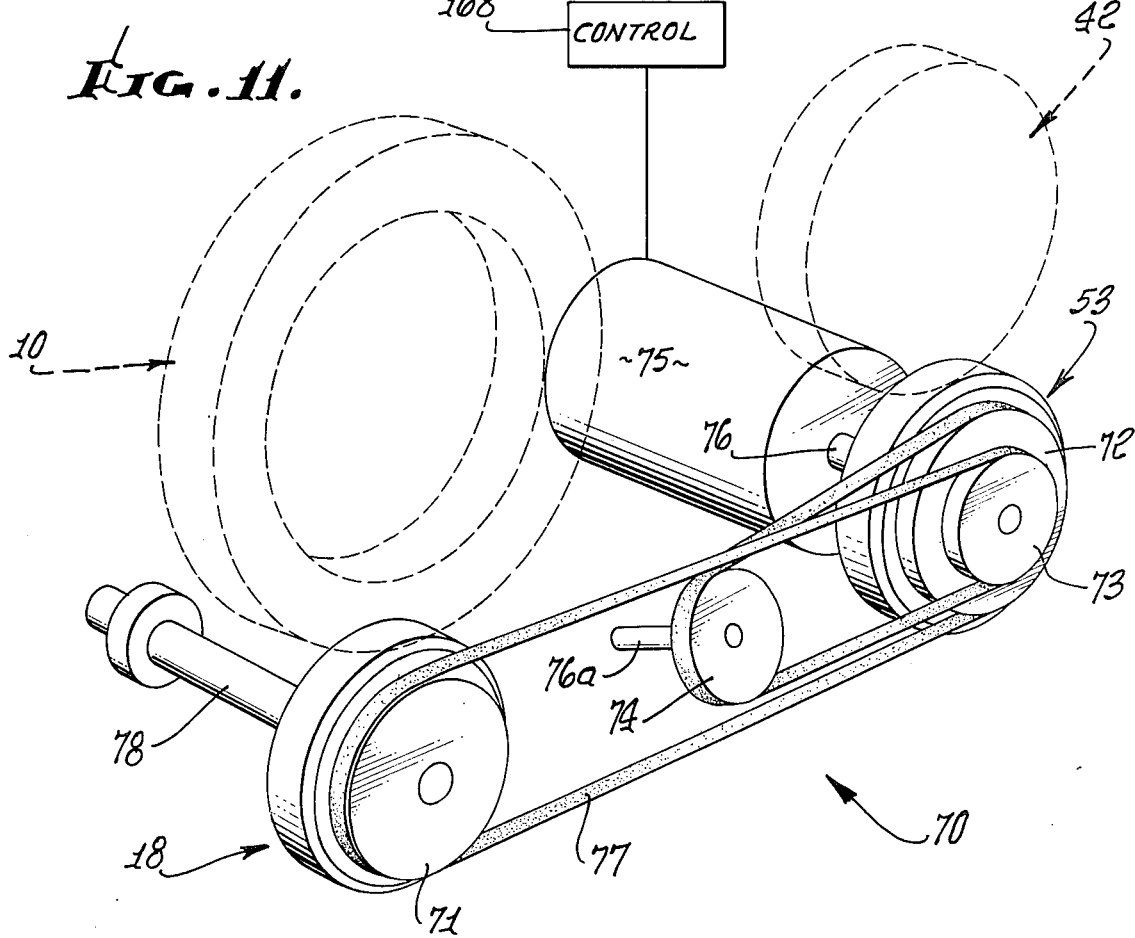
FIG. 11 is a showing in perspective of a single motor, differential belt drive system for driving the rotors seen in FIG. 2.

The invention also contemplates the provision of a single motor, and a belt drive system operatively connected between the single motor and the two rotors. In the example shown in FIG. 11, the endless belt drive system 70 includes first and second pulleys 71 and 72 respectively connected with the rotors 18 and 53, a third pulley 73 and also the motor 75 directly connected with the second pulley (as for example by connected pulleys 72 and 73 on the motor output shaft 76), an idling or transition fourth pulley 74 suitably mounted at 76a, and an elastic belt 77 entraining all the pulleys. The entrainment is characterized in that the belt passes over the first pulley 71, then over the second pulley 72, then over the fourth pulley 74 and third pulley 73 in sequence, and then back to the first pulley. By selecting proper pulley radii, the drive exhibits two different drive ratios as between drive shaft 76 and driven shaft 78 (on which pulley 71 is mounted), depending upon the direction of rotation of shaft 76. For example, if the radius of pulley 72 is 10% greater than that of pulley 71, and the radius of pulley 73 is 10% smaller than that of pulley 71, then when shaft 76 is rotated in counterclockwise direction, shaft 76 will rotate faster than shaft 76 by some small percentage, for example $+ \Delta \%$. Conversely, when shaft 76 is rotated clockwise, shaft 78 will rotate slower than shaft 76 by the same amount, i.e. $- \Delta \%$. The exact magnitude of $\Delta$ depends upon the elastic properties of the belt, the amount of frictional as well as torque loading that is present at reels shaft, and the coefficient of friction between the pulley and belt. That coefficient must be high enough so that slippage does not occur at all points of contact on the periphery of any pulley. A motor control appears at 168.

Referring to FIG. 13, the alternate drive means includes a single motor 80 and a belt drive system 81 operatively connected between the motor and the two reels 110 and 142 (corresponding to reels 10 and 42 described above), rather than to the two rotors 118 and 153 (corresponding to the rotors 18 and 53 described above). System 81 is like system 70 in construction and operation, and therefore the number of corresponding elements are identical. On the other hand, the rotary outputs of the pulleys 71 and 72 are applied to the reels as via their hubs schematically indicated at 113 and 144 (corresonding with hubs 13 and 44 above). A motor control appears at 168.

Figure 14:
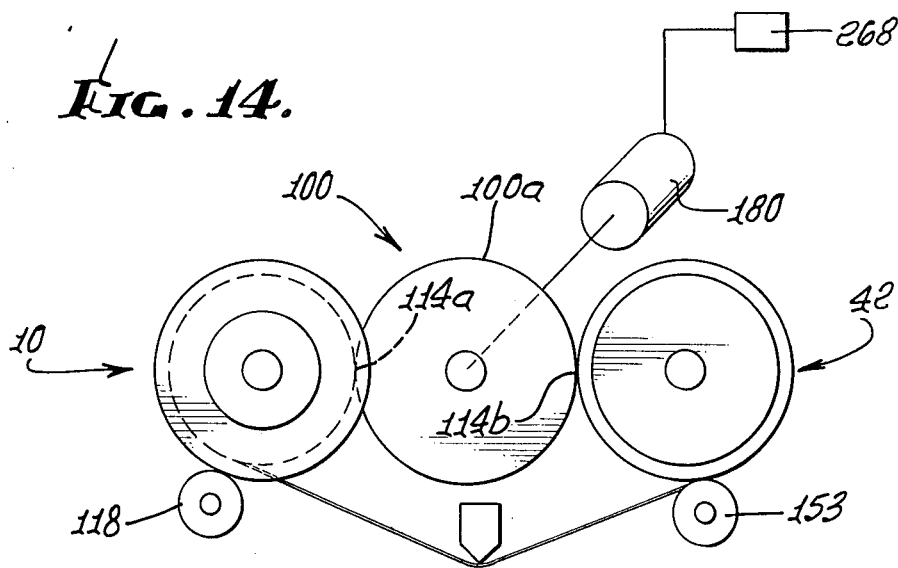
FIG. 14 is a schematic showing of an alternate drive system using a single motor, for driving a single rotor that in turn drives both tape pack peripheries.

Referring to FIG. 14, the illustrated drive means includes a single motor 180 driving a single capstan rotor 100 the periphery 100a of which engages the tape on both reels 10 and 42, i.e. at points 114a and 114b. The rotors 118 and 153 are unpowered, as they are in FIG. 13 and may be rotated by the reels; alternatively, they represent structure rotary or non-rotary, to urge the leader into the grooves. A motor control appears at 268.

Figure 15:
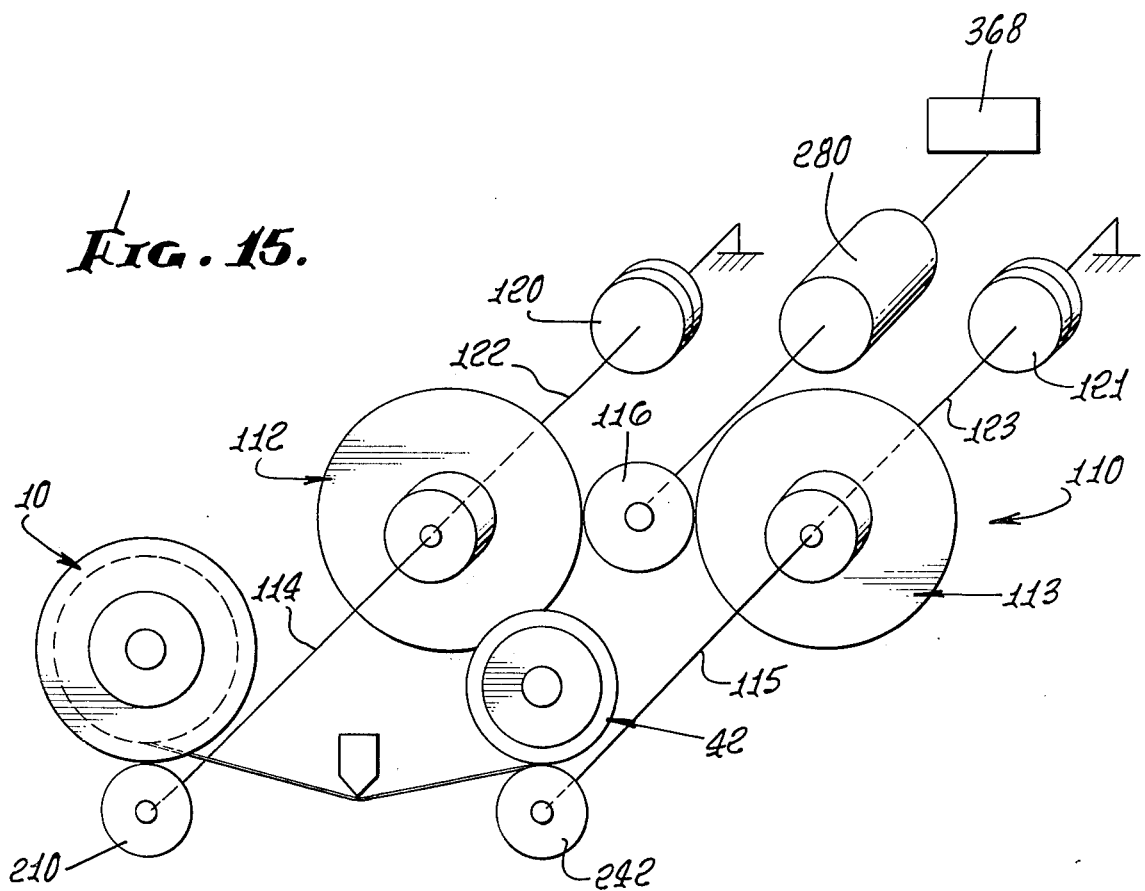
FIG. 15 is a schematic showing of an alternate drive system using a single motor and a clutch arrangement, for driving the rotors as seen in FIG. 2.

Referring to FIG. 15, the drive means includes a single motor 280 controlled at 368. A drive train 110 couples the motor and the two rotors 210 and 242 (corresponding to rotors 18 and 53), the drive train including two clutches 112 and 113. Clutch 112 engages with rotor shaft 114 in the reverse (clockwise) direction of rotation of reel 10, whereas clutch 113 engages with rotor shaft 115 in the forward (counterclockwise) direction of rotation of reel 42. A motor driven disc 116 may drive the peripheries of both clutches, as shown, and drag brakes 120 and 121 coupled to the clutches at 122 and 123 serve to produce drag, i.e. brake 120 resists rotation of reel 10 when take-up reel 42 is forwardly driven, and brake 121 resists rotation of reel 42 when supply reel 10 is reversely driven in wind-up mode.

I claim:
1. In a tape transport, the combination comprising
   a. a reel having an axis, spaced flanges extending normal to said axis, and a hub about which tape is wound for storage between the flanges,
   b. a leader strip connected with the tape, the width of the leader strip being greater than the tape width, and
   c. there being grooves sunk in the inner walls of the flanges and extending about said axis outwardly of the hub to retain the opposite edges of the leader strip so that the tape becomes protectively confined by the flanges and leader strip, the tape and flanges forming a rotatable unit, and
   d. a driving and supporting system for the reel and tape, said system including an endless drive belt, said system being in peripheral engagement with said unit and positioning the reel for rotation, said system including an endless surface carried for bodily movement in the plane of the reel into and out of engagement with said unit to enable removal of the reel from rotating position, said surface projecting between the flange to engage the leader and tape, and
   e. stripper means projecting between the leader and tape on the reel.
2. The combination of claim 1 wherein the width of the leader strip is greater than the spacing between the flange inner walls radially outwardly of the grooves.
3. In a tape transport, the combination comprising
   a. a reel having an axis, spaced flanges extending normal to said axis, and a hub about which tape is wound for storage between the flanges,
   b. a leader strip connected with the tape, the width of the leader strip being greater than the tape width, and
   c. there being grooves sunk in the inner walls of the flanges and extending about said axis outwardly of the hub to retain the opposite edges of the leader strip so that the tape becomes protectively confined by the flanges and leader strip, the tape and flanges forming a rotatable unit,
   d. means in peripheral engagement with said unit and positioning the reel for rotation, said means including a displaceable element carried for bodily movement in the plane of the reel into and out of engagement with said unit to enable removal of the reel from rotating position, said element projecting between the flanges to engage the leader and tape, and
   e. stripper means projecting between the leader and tape on the reel,
   f. said means including a rotor having a radially outwardly tapered periphery projecting sufficiently between the flanges and in local contact with the leader to bow the leader widthwise for forcibly urging the leader opposite edges into the grooves.
4. The combination of claim 3 wherein the flanges have annular opposed faces which taper radially inwardly toward said grooves to guide the leader opposite edges toward said grooves.
5. The combination of claim 1 wherein said system includes three rotors in peripheral engagement with said flanges and positioning the reel for rotation, one rotor being a drive rotor to rotate the reel, and said surface being on another of said rotors.
6. The combination of claim 1 wherein said surface is yieldably urged toward said unit.
7. The combination of claim 6 wherein the reel is annular.
8. The combination of claim 6 including a housing for the reel in said position and for said means, the housing containing an opening enabling pull out withdrawal of the reel from the housing in a direction generally normal to the reel axis.
9. In a tape storage unit, the combination comprising
   a. a reel having an axis, spaced flanges extending normal to said axis, and a hub about which tape is wound for storage between the flanges,
   b. a leader strip connected with the tape, the width of the leader strip being greater than the tape width,
   c. the flanges retaining the opposite edges of the leader strip so that the tape becomes protectively confined by the flanges and leader strip,
   d. there being multiple rotors at least two of which are in peripheral engagement with said flanges and positioning the reel for rotation,
   e. means mounting another of the rotors for movement away from the reel to enable bodily removal of the reel from rotating position and return of the reel to said position, said means also mounting the other rotor for return movement toward the reel in said position,
   f. there being a housing for the reel in said position and for said rotors, the housing containing an opening enabling pull out withdrawal of the reel from the housing in a direction generally normal to the reel axis, and said means mounting said other rotor comprising a closure for said opening, the closure carried for movement toward and away from the reel in said position, and in a direction generally normal to the reel axis.
10. The combination of claim 9 including yieldable means urging said other rotor toward the reel in said position, when the closure is located in a position closing said opening.
11. In a tape storage unit, the combination comprising
    a. a reel having an axis, spaced flanges extending normal to said axis, and a hub about which tape is wound for storage between the flanges,
    b. a leader strip connected with the tape, the width of the leader strip being greater than the tape width,
    c. the flanges retaining the opposite edges of the leader strip so that the tape becomes protectively confined by the flanges and leader strip,
    d. there being multiple rotors at least two of which are in peripheral engagement with said flanges and positioning the reel for rotation, and e. a stripper finger projecting between the leader and the tape on the reel to flex and strip the leader strip free of said flanges as the reel rotates.

12. In a tape transport, the combination comprising
   a. first and second tape reel each having an axis, a hub and spaced flanges projecting normal to said axis and radially outwardly of the hub,
   b. tape wound about one of the hubs and a leader strip connected with the tape, the width of the leader strip being greater than the tape width,
   c. there being grooves sunk in the inner walls of the flanges of each reel and extending about the reel axis outwardly of the hub to receive the opposite edges of the leader strip,
   d. means mounting the reels for rotation in spaced apart relation,
   e. guide means for guiding leader strip and tape travel between the reels, and
   f. structure located adjacent the reel peripheries to urge the leader toward said grooves in either direction of tape travel between the reels.

13. The combination of claim 12 including a first stripper finger projecting between the flanges of the first reel to flex and strip the leader from the first flange grooves in response to rotation of the first reel.

14. The combination of claim 13 including a second stripper finger projecting between the flanges of the second reel to flex and feed the leader between and into the second flange grooves in response to said delivery of the leader between the flanges of the second reel.

15. The combination of claim 13 including drive means to rotate said reels both in one rotary direction, and alternatively both in the opposite rotary direction.

16. The combination of claim 15 wherein one rotor is connected with the drive means and engages at least one flange on the first reel, and another rotor is also connected with the drive means and peripherally engages the tape as it winds about the second reel hub.

17. The combination of claim 16 wherein said drive means comprises a pair of motors respectively connected with the rotors.

18. The combination of claim 15 wherein said drive means includes motor means and control means for said motor means, the drive means rotating the reels so that the tape extent being transported between the reel is maintained in tension.

19. The combination of claim 15 wherein said drive means includes a single motor, and a belt drive system operatively connected between said single motor and the two rotors.

20. The combination of claim 19 wherein said belt drive system includes first and second pulleys respectively connected with the rotors, a third pulley and the motor connected with the second pulley, an idling fourth pulley, and an elastic belt entraining all of said pulleys chracterized in that the belt passes over the first pulley, then over the second pulley, then over the fourth pulley and third pulley in sequence, and then back to the first pulley.

21. The combination of claim 15 wherein said drive means includes a single motor and a belt drive system operatively connected between the single motor and the two reels.

22. The combination of claim 21 wherein said belt drive system includes first and second pulleys connected with the respective reels, a third pulley and the motor connected with the second pulley, an idling fourth pulley, and an elastic belt entraining all of said pulleys characterized in that the belt passes over the first pulley, then over the second pulley, then over the fourth pulley and third pulley in sequency, and then back to the first pulley.

23. The combination of claim 15 wherein said drive means includes a single motor and a drive capstan driven by the motor and engaging the peripheries of the tape on both reels.

24. The combination of claim 15 wherein said drive means includes a single motor and a drive train couples the motor and the two rotors, said drive train including two slip clutches respectively connected with each rotor.

25. The combination of claim 24 wherein said drive means includes a drag brake connected with each clutch.

26. The combination of claim 1 including a tab on the end of the leader, the grooves located adjacent the hub, the leader strip wound about the hub and the tape wound about the leader strip.

27. The combination of claim 13 including a tab on the end of the leader to project outwardly of the first flange grooves for engagement with said first stripper finger.

28. The combination of claim 13 wherein the leader strip is bowed outwardly by the stripper finger during stripping.

29. A belt drive system for use in a tape transport wherein first and second tape reels are to be rotated, said system including first and second pulleys for effecting drive of the respective reels, a third pulley and a motor connected with the second pulley, an idling fourth pulley, and an endless elastic belt entraining all of the pulleys characterized in that the belt passes over the first pulley, then over the second pulley, then over the fourth pulley and third pulley in sequence, then back to the first pulley.

30. In a tape transport, the combination comprising
   a. first and second tape reels each having an axis, a hub and spaced flanges projecting normal to said axis and radially outwardly of the hub,
   b. tape wound about one of the hubs and a leader strip connected with the tape, the width of the leader strip being greater than the tape width,
   c. the inner walls of the flanges of each reel providing means extending about the reel axis outwardly of the hub to receive and retain the opposite edges of the leader strip,
   c. means mounting the reels for rotation in spaced apart relation, an endless belt system driving the reels and tape,
   e. guide means for guiding leader strip and tape travel between the reels, and
   f. structure located adjacent at least one reel periphery to urge the leader toward said retention means at the flange inner walls during tape travel between the reels.

31. In a tape storage unit, the combination comprising
   a. a reel having an axis, spaced flanges extending normal to said axis, and a hub about which tape is wound for storage between the flanges,
   b. a leader strip connected with the tape, the width of the leader strip being greater than the tape width
   c. the flanges retaining the opposite edges of the leader strip so that the tape becomes protectively confined by the flanges and leader strip, the tape and flanges defining a rotatable unit, d. a driving and supporting system for the reel and tape, said system including an endless drive belt, said system being in peripheral engagement with said unit and positioning the reel for rotation, said system including an endless surface carried for bodily movement out of engagement with said unit to enable bodily removal of the reel from rotating position and return of the reel to said position, and e. a stripper finger projecting between the leader and the tape on the reel to flex and strip the leader strip free of said flanges as the reel rotates.

32. In a tape transport, the combination comprising a. first and second tape reels each having an axis, a hub and spaced flanges projecting normal to said axis and radially outwardly of the hub, b. tape wound about one of the hubs and a leader strip connected with the tape, the width of the leader strip being greater than the tape width, c. there being retention structure at the inner sides of the flanges of each reel and extending about the reel axis outwardly of the hub to receive and retain the opposite edges of the leader strip, d. means mounting the reels for rotation in spaced apart relation, an endless belt system driving the reels and tape, e. guide means for guiding leader strip and tape travel between the reels, and f. other structure located adjacent reel flange peripheries to urge the leader toward said retention structure during tape travel between the reels.

* * * * *